US 9,803,544 B2

(12) United States Patent
Beck et al.

(10) Patent No.: US 9,803,544 B2
(45) Date of Patent: Oct. 31, 2017

(54) HEAT EXCHANGER FOR INTERNAL COMBUSTION ENGINES

(71) Applicant: MAHLE International GmbH, Stuttgart (DE)

(72) Inventors: Claus Beck, Esslingen (DE); Hervé Palanchon, Cologne (DE); Jürgen Rosin, Remshalden (DE)

(73) Assignee: MAHLE International GmbH, Stuttgart (DE)

( * ) Notice: Subject to any disclaimer, the term of this patent is extended or adjusted under 35 U.S.C. 154(b) by 1139 days.

(21) Appl. No.: 13/919,480

(22) Filed: Jun. 17, 2013

(65) Prior Publication Data
US 2013/0276744 A1 Oct. 24, 2013

Related U.S. Application Data

(62) Division of application No. 11/579,669, filed as application No. PCT/EP2005/004854 on May 4, 2005, now Pat. No. 8,464,778.

(30) Foreign Application Priority Data

May 7, 2004 (DE) .................... 10 2004 023 319 U
Jun. 21, 2004 (DE) ........................ 10 2004 029 863
(Continued)

(51) Int. Cl.
F01N 5/02 (2006.01)
F02B 77/00 (2006.01)
(Continued)

(52) U.S. Cl.
CPC .............. F02B 77/00 (2013.01); F01N 3/043 (2013.01); F01N 2240/02 (2013.01);
(Continued)

(58) Field of Classification Search
CPC ......... F02B 77/00; F02M 26/11; F02M 26/26; F02M 26/30; F02M 26/32; F01N 2240/02; F01N 2410/00; Y10T 137/87812
(Continued)

(56) References Cited

U.S. PATENT DOCUMENTS 55,072 A    5/1866  Doty
137,268 A   3/1873  Wetmore
(Continued)

FOREIGN PATENT DOCUMENTS

DE  199 62 863 A1   6/2001
DE  100 25 877 A1  12/2001
(Continued)

OTHER PUBLICATIONS

Office Action dated Feb. 8, 2011 in related Japanese Application No. 2007-512020 (7 pgs.).
(Continued)

Primary Examiner — Travis Ruby
(74) Attorney, Agent, or Firm — Muncy, Geissler, Olds & Lowe, P.C.

(57) ABSTRACT

A heat exchanger for an internal combustion engine includes a first flow channel; a second flow channel arranged adjacent to the first flow channel; a line separate from the second flow channel; and a valve channel in which an adjustable valve element is disposed. The valve channel is arranged upstream of the first and second flow channels and an inlet channel is arranged upstream of the valve channel in a flow direction of exhaust gas. The valve element includes a baffle plate, the baffle plate having an end portion that extends diagonally in the valve channel with respect to the flow axis of the first flow channel. The valve element includes a flap that is pivotably mounted at the end portion of the baffle plate such
(Continued)

that the flap is pivotable about an axis that extends in a direction of a width of a common housing.

6 Claims, 6 Drawing Sheets

(30) Foreign Application Priority Data

Aug. 20, 2004 (DE) .................. 10 2004 040 667
Aug. 20, 2004 (DE) .................. 10 2004 040 668 U

(51) Int. Cl.
*F01N 3/04* (2006.01)
*F02M 26/11* (2016.01)
*F02M 26/26* (2016.01)
*F02M 26/30* (2016.01)
*F02M 26/32* (2016.01)

(52) U.S. Cl.
CPC .......... *F01N 2410/00* (2013.01); *F02M 26/11* (2016.02); *F02M 26/26* (2016.02); *F02M 26/30* (2016.02); *F02M 26/32* (2016.02); *Y02T 10/20* (2013.01); *Y10T 137/87812* (2015.04)

(58) Field of Classification Search
USPC ....... 165/100, 101, 103, 145, 164, 159, 162, 165/41, 51; 123/568.12; 137/875
See application file for complete search history.

(56) References Cited

U.S. PATENT DOCUMENTS

| | | |
|---|---|---|
| 325,449 A | 9/1885 | Schueler |
| 2,729,158 A | 1/1956 | Wilfert |
| 4,164,255 A | 8/1979 | Binet et al. |
| 6,141,961 A | 11/2000 | Rinckel |
| 6,330,910 B1 | 12/2001 | Bennett |
| 6,955,213 B2 | 10/2005 | Stonehouse et al. |
| 7,032,577 B2 | 4/2006 | Rosin et al. |
| 2003/0033801 A1 | 2/2003 | Hinder et al. |
| 2003/0192606 A1 | 10/2003 | Heckt |
| 2004/0251012 A1 | 12/2004 | Bush et al. |
| 2005/0039729 A1 | 2/2005 | Rosin et al. |
| 2005/0199381 A1 | 9/2005 | Mercz et al. |
| 2006/0162706 A1 | 7/2006 | Rosin et al. |

FOREIGN PATENT DOCUMENTS

| | | |
|---|---|---|
| DE | 201 21 018 U1 | 5/2002 |
| DE | 102 03 003 A1 | 8/2003 |
| DE | 102 28 619 A1 | 1/2004 |
| DE | 103 03 910 A1 | 8/2004 |
| DE | 103 46 250 A1 | 5/2005 |
| EP | 0 942 156 B1 | 9/1999 |
| EP | 0 987 427 B1 | 3/2000 |
| EP | 1 273 786 B1 | 1/2003 |
| EP | 1 288 603 B1 | 3/2003 |
| EP | 1 367 253 B1 | 3/2003 |
| EP | 1 363 013 A1 | 11/2003 |
| JP | 2001-165000 A | 6/2001 |
| JP | 2003-113742 A | 4/2003 |
| JP | 2003-278609 A | 10/2003 |
| JP | 2004076587 A | 3/2004 |
| JP | 2004-124809 A | 4/2004 |
| WO | WO 02/10574 A1 | 2/2002 |
| WO | WO 03/062625 A1 | 7/2003 |
| WO | WO 03/085252 A2 | 10/2003 |
| WO | WO 03/098026 A1 | 11/2003 |

OTHER PUBLICATIONS

Office Action dated Feb. 8, 2011 in related Japanese application No. 2007-512018 (2 pgs.).

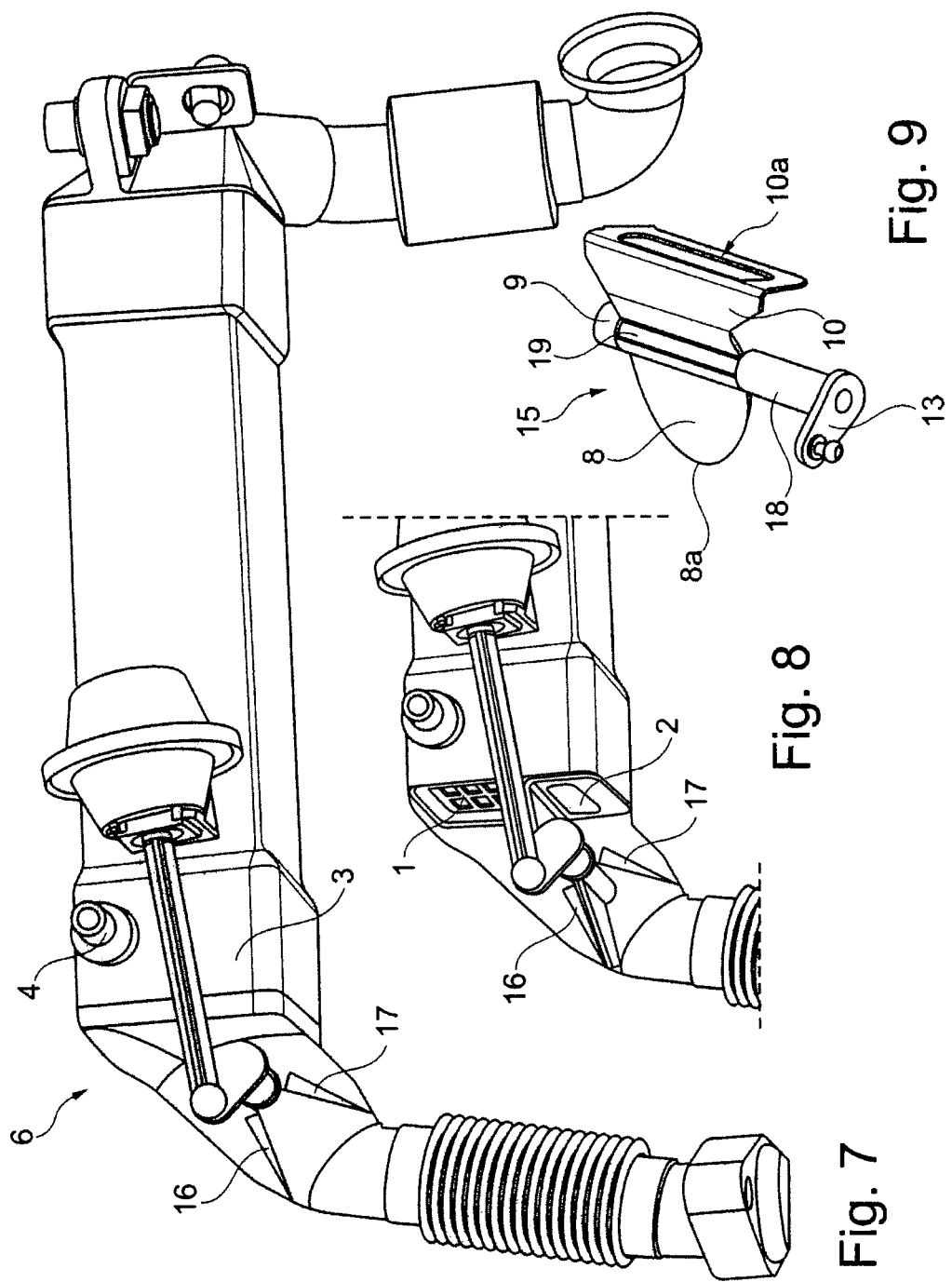

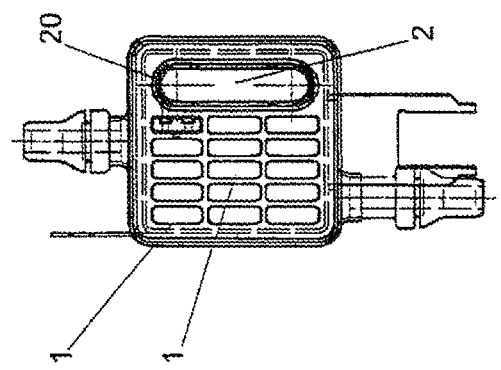
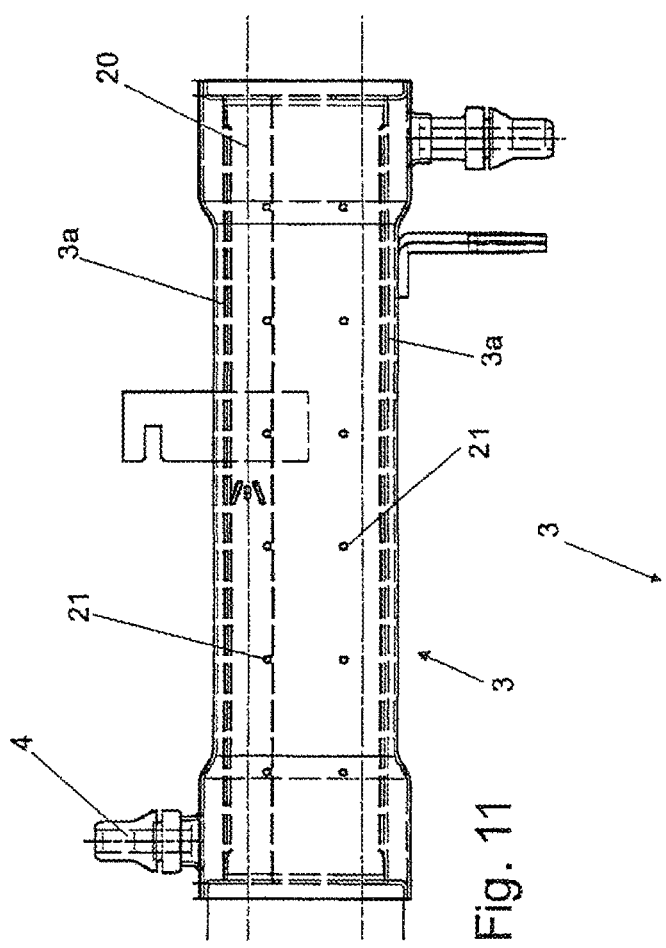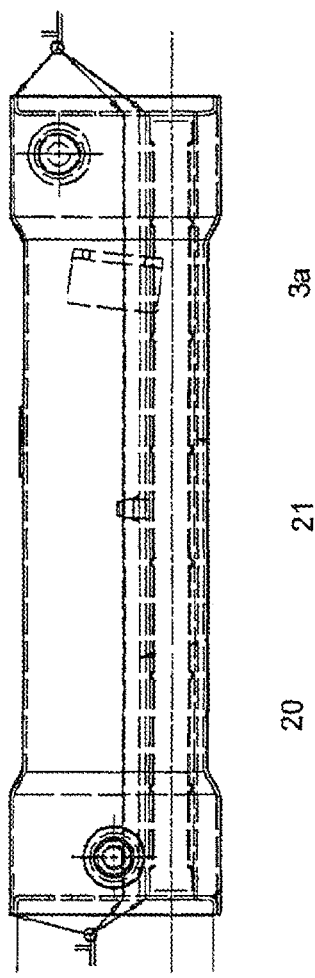

HEAT EXCHANGER FOR INTERNAL COMBUSTION ENGINES

CROSS REFERENCE TO RELATED APPLICATIONS

This application is a divisional of U.S. application Ser. No. 11/579,669 filed Nov. 7, 2006; which is a national stage entry of International application no. PCT/EP2005/004854 filed May 4, 2005; which claims priority to German application nos. 102004023319.5 filed May 7, 2004, 102004029863.7 filed Jun. 21, 2004, 102004040667.7 filed Aug. 20, 2004, and 102004040668.5 filed Aug. 20, 2004. The disclosure of all prior applications is hereby incorporated by reference.

BACKGROUND OF THE INVENTION

The invention relates to a heat exchanger for internal combustion engines.

In the construction of modern motor vehicles with internal combustion engines, heat exchangers are increasingly being employed by means of which heat from the vehicle exhaust gases are given off to a coolant. This can be desirable for the purpose of rapid heating of the coolant or for the purpose of cooling the exhaust gas, for example in conjunction with an exhaust gas recovery system. Particularly in conjunction with other components and aggregates of modern motor vehicles, problems are encountered here with respect to the exhaust flow and to the installed space.

DE 102 03 003 A1 describes a heat exchanger for exhaust gases in which a first and a second flow channel for exhaust gases are arranged in parallel in a common housing, with a valve channel arranged upstream of the flow channels having the same flow direction as the flow channels, in other words being arranged linearly to the flow channels.

DE 100 25 877 A1 describes a heat exchanger for exhaust gases in several embodiments in which a valve channel arranged upstream of each of the flow channels has the same flow direction on the inlet side as the flow channels, in other words being arranged linearly to the flow channels.

SUMMARY OF THE INVENTION

The object of the invention is to provide a heat exchanger as mentioned at the beginning that is particularly advantageous with respect to the exhaust flow.

This invention is achieved according to the invention for a heat exchanger as mentioned at the beginning by means of the characteristic features of claim 1.

This advantageously achieves the situation that the heat exchanger can be flexibly arranged even with limited installation space, such as in the engine compartment of a motor vehicle. It is also advantageous that the valve element is not arranged in the same flow axis as the flow channels, as the engine speed-dependent standing waves formed by the pulsating exhaust flow from internal combustion engines thus have a lesser effect on the mechanical parts of the valve element. Longitudinal and transverse vibrations of the heat exchanger housing in the area of the valve channel are also reduced, which is also favorable for the function and service life of the valve mechanics.

In a preferred embodiment of a heat exchanger according to the invention, the valve channel is arranged upstream of the flow channels and an inlet channel is arranged upstream of the valve channel in flow direction of the exhaust gases, with a flow axis of the inlet channel particularly preferably having a different direction than the flow axis of the valve channel and than the flow axis of the flow channels. This permits a gradual curvature of the exhaust flow so that an unhindered exhaust flow can be assured with a generally smaller construction. An angle enclosed between the flow axis of the valve channel and the flow axis of the inlet channel larger than 30 degrees is particularly preferred in order to achieve an adequately large deflection of the exhaust flow.

Also preferred is an angle enclosed between the flow axis of the valve channel and the flow axis of the flow channel of larger than 30 degrees, particularly preferably larger than 40 degrees. The angle enclosed between flow channel and valve channel and between valve channel and inlet channel can be added here with respect to the exhaust flow in order to attain in particular a large deflection of the exhaust flow without having to take any significant associated disadvantages into account. In particular an unfavorable exhaust flow with respect to vortice flow and flow resistance that results in a deflection of the exhaust flow by 90 degrees in a minimum of space is effectively avoided.

In order to particularly avoid the disadvantages mentioned above, an angle enclosed between the flow axis of the valve channel and the flow axis of the flow channel of smaller than 60 degrees is particularly preferred. This is not contradicted by the two-stage deflection of the exhaust flow by a total angle of up to roughly 90 degrees mentioned above.

In a preferred embodiment of the invention, a mean flow length of one of the flow channels is at least a factor of two, particularly preferably a factor of 2.5 larger than a mean flow length of the valve channel. Flow length is understood here as the mean distance traveled by the exhaust gases, in other words roughly the distance along a symmetry axis of an exhaust channel. On the basis of the dimensioning of the flow channels dictated by the given heat exchanger capacity, this permits a particularly space-saving construction of a heat exchanger according to the invention.

The valve element furthermore preferably has exactly one adjustable flap element so that only a small number of components is necessary. With respect to a correspondingly simple and effective mechanism of the valve element, the flap element is preferably mounted on a driven rotatable shaft.

The valve channel particularly preferably has a partition wall adjoining the flap element so that the valve channel is divided at least sectionally into two valve channel halves by the partition wall. At the same time this permits a simple construction and an exhaust flow with minimized vortice flow.

In a preferred embodiment of the invention, the second flow channel is arranged essentially parallel to the first flow channel over its whole length, and particularly preferably the first flow channel and the second flow channel are arranged in a common housing. These measures each favor a compact design of the heat exchanger.

As a result of the contact between the valve element and the recess it is advantageously possible for one of the flow channels in each case to be particularly well sealed against the flow of exhaust gases. In addition, premature material wear in the area of a contact between valve element and valve channel can be easily avoided.

The valve channel advantageously has a circular cross-section, and the recess can be created by forming one wall of the valve channel, in particular by embossing. This enables the recess to be produced simply and inexpensively.

The double wall of the second valve channel permits a particularly good insulation of the exhaust gas flowing through this channel against an exchange of heat.

The second valve channel advantageously has an inner pipe that is contained in a housing with one outer surface of the inner pipe being held at a distance from the housing. This enables the heat exchanger as a whole to be built compactly, with a further combination of the housing with the first flow channel to create a single construction unit being particularly advantageous.

The distance between the housing and the inner pipe can be advantageously fixed by means of spacer elements. These can comprise a plurality of studs arranged on the outer surface of the inner pipe so that a double wall of the second flow channel with good thermal insulation can be achieved using simple means.

It is furthermore advantageously provided that the inner pipe is directly connected to a baffle plate with the baffle plate being arranged in the valve channel. It is particularly advantageous here that the valve element is movably arranged on the baffle plate and the valve channel is directly connected to the housing. This results in a reliable and simple sequence in the manufacture of the heat exchanger according to the invention, in that baffle plate, inner pipe and housing are first aligned with one another and joined to one another. The valve channel can then be positioned above the baffle plate, aligned with it and connected to the housing. The respective joints can be made by welding or brazing, although other forms of connection are not precluded.

Depending on the requirements, the valve element of a device according to the invention can be pivotably mounted at a single bearing point on the valve channel. Alternatively it can also be mounted at two spaced bearing points on the valve channel.

Further features and advantages of the invention can be seen from the illustrative embodiment described below and from the dependent claims.

Three preferred illustrative embodiments of a heat exchanger according to the invention are described below and explained in greater detail by reference to the attached drawings.

BRIEF DESCRIPTION OF THE DRAWINGS

FIG. 7 shows a three-dimensional view of a second illustrative embodiment of a heat exchanger according to the invention.

FIG. 8 shows a detail view of the heat exchanger from FIG. 7 with the inside of the valve channel illustrated.

FIG. 9 shows a three-dimensional view of the valve element of the heat exchanger from FIG. 7 and FIG. 8.

FIG. 11 shows a schematic top view from above onto a detail of the heat exchanger from FIG. 10.

FIG. 12 shows a schematic top view onto the detail from FIG. 11 from the side.

FIG. 13 shows a schematic top view onto the detail from FIG. 11 from the front.

DETAILED DESCRIPTION OF THE INVENTION

Figure 6:
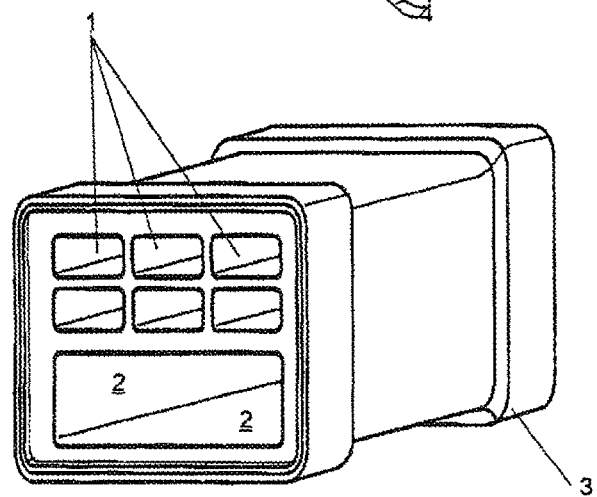
FIG. 6 shows an exploded three-dimensional view of a detail from the heat exchanger from FIG. 1.

The heat exchanger according to the invention shown in the first illustrative embodiment comprises a first flow channel 1 and a second flow channel 2, in this case with the first flow channel comprising a multiplicity of parallel individual channels (see FIG. 6). FIG. 6 shows that the two flow channels are parallel to one another and incorporated into the same housing 3.

A line 4 to conduct a liquid coolant is also located in the housing 3 and exits the housing at an inlet-side port 4a and an outlet-side port 4b. Inside the housing the line 4 is only in essentially heat contact with the first flow channel so that a relevant heat exchange between exhaust gas and coolant only takes place when the exhaust gas flows through the first flow line 1.

The end of the heat exchanger in flow direction S of the exhaust gases has an outlet channel 5 that in this case is aligned parallel to the flow channels with respect to the exhaust flow. For particular demands it can be preferred, however, for the outlet channel 5 to be arranged at an angle to the flow channels 1, 2.

Figure 1:
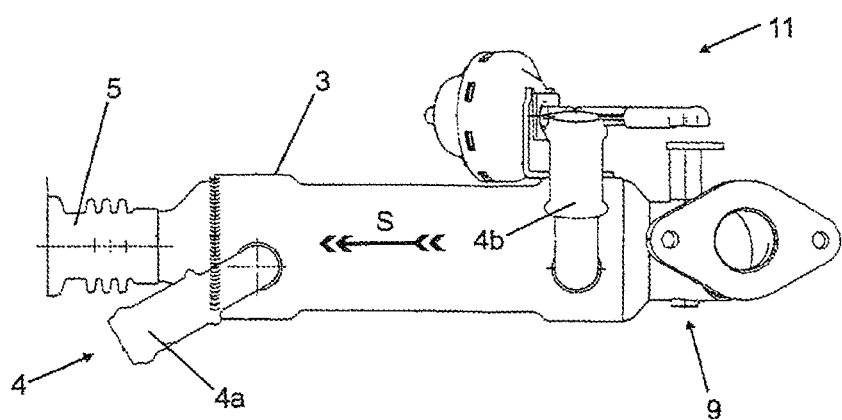
FIG. 1 shows a top view of a first illustrative embodiment of a heat exchanger according to the invention from above.
Figure 2:
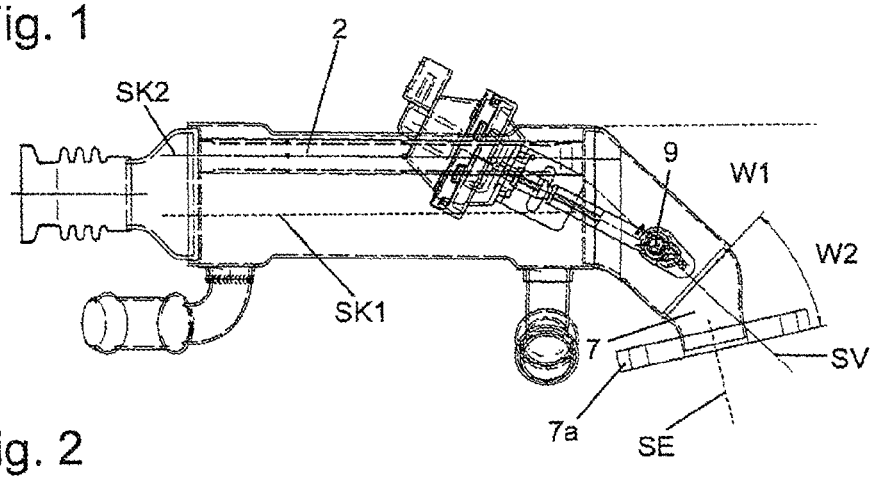
FIG. 2 shows the heat exchanger according to FIG. 1 rotated through 90°.
Figure 3:
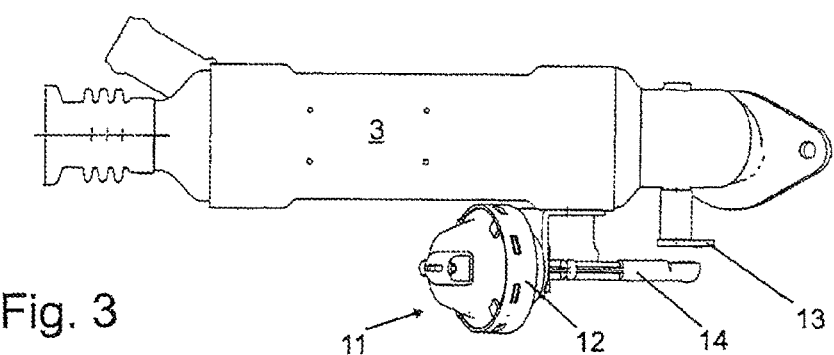
FIG. 3 shows the heat exchanger according to FIG. 2 rotated through 90°.
Figure 4:
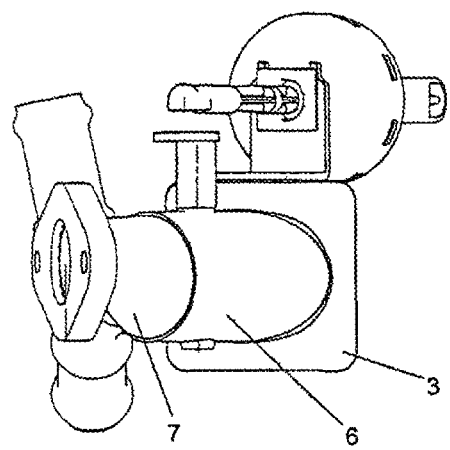
FIG. 4 shows a top view of the heat exchanger according to FIG. 1 from the front.

Arranged upstream of the flow channels 1, 2 in flow direction S is a valve channel 6 that is welded to the housing 3. The valve channel 6 has a circular cross-section and is attached to the housing 3 at an angle W1 of roughly 42° relative to the flow channels 1, 2. This angle is enclosed between an inlet-side flow axis SV and flow axes SK1, SK2 of the first flow channel 1 and second flow channel 2 respectively (see FIG. 2).

Welded upstream of the valve channel 6 in flow direction S is an inlet channel 7 that can be connected on the inlet side via a flange 7a to the further exhaust line. An inlet-side flow axis SE of the inlet channel encloses an angle W2 of 35° with the inlet-side flow axis SV of the valve channel. The angles W1 and W2 lie in a plane so that the flow axis SE of the inlet channel and the flow axes SK1, SK2 of the flow channels 1, 2 enclose a total angle of 77°. Alternatively, however, the angles can also lie in different planes and deviate from the values shown here in order to permit an adaptation to the prevailing exhaust flow in a particular case.

Figure 5:
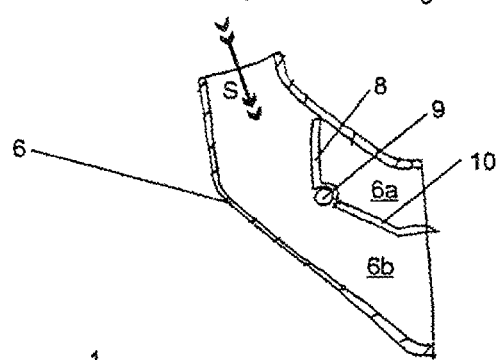
FIG. 5 shows a schematic sectional view through the valve channel of the heat exchanger in the orientation according to FIG. 2.

Contained in the valve channel 6 is a flap element 8 designed as a driven moving flap (see FIG. 5). The flap 8 is rigidly affixed to a rotatable shaft 9 that extends along one end-side edge of the flap 8 and perpendicularly through the valve channel 6. In addition, a fixed baffle plate 10 is provided in the valve channel that serves as a continuation of the valve flap. Due to the baffle plate 10, an outlet-side end area of the valve channel is divided into a first valve channel half 6a and a second valve channel half 6b, with each of the valve channel halves 6a, 6b being connected to one of the flow channels 1, 2. The baffle plate 10, the flap 8 and the shaft 9 thus together form a valve element through which the exhaust flow can be optionally directed into at least two different channels.

The flap 8 is bent or formed elliptically at its edge furthest from the shaft 9 in order to achieve a sealing fit with the wall of the valve channel 6 with its circular cross-section. The wall of the valve channel can preferably have a corresponding machining in the area of contact of the valve flap.

The flap 8 can be moved by means of a drive 11 of the shaft 9, with, in this case the drive 11 consisting of a vacuum dashpot 12 through which a push rod 14 can move. The end of the push rod 14 is connected to a pivot journal 13 attached to the shaft 9 by means of a ball joint. As a result, a pushing or pulling movement of the push rod 14 causes a rotation of the shaft 9 and hence an adjustment of the flap 8. Depending on the position of the flap, the exhaust gas can be directed completely, to a random extent or not at all through the first flow channel 1 that serves for the heat exchange.

The dimensioning of the heat exchanger is advantageously such that it can be generally built compactly without hindering the exhaust flow. Mean flow lengths of the two flow channels 1, 2 are thereby equal and correspond to the geometric length of the two channels. A mean flow length of the valve channel 6 is roughly the geometric length of a center line of the valve channel 6. In the present case the mean flow length of a flow channel 1, 2 is roughly 2.7-times larger than the mean flow length of the valve channel 6. While maintaining the advantages of the invention, the predominant part of the overall length of the heat exchanger is thus available for the actual heat exchange.

The heat exchanger according to the second illustrative embodiment (FIG. 7 to FIG. 9) has, as with the first illustrative embodiment, a valve channel 6 that is arranged at an angle in relation to the flow channels 1, 2. The valve element 15 comprises a baffle plate 10 on which a valve flap 8 mounted on a shaft 9 is arranged.

The valve channel 6 comprises a section with an essentially circular cross-section. Recesses are provided in the wall of this section which an edge area 8a of the flap 8 contacts planely when the flap is in an end position. The transmission of the exhaust flow through the second flow channel 2 is assigned here to the contact on the first recess 16, and the transmission through the first flow channel 1 to the contact on the recess 17. FIG. 8 shows the transmission through the second flow channel.

The recesses 16, 17 are each produced by pressing a correspondingly formed punch into the wall of the valve channel 6 so that they are visible from the outside. The plane contact of the flap 8 on the recesses 16, 17 improves the sealing of the flap and a vibrating striking of the flap against the wall of the valve channel 6 is reduced.

As shown in FIG. 9, the valve element 15 has a first bearing point 18 and a second bearing point 19 further at a distance from the first bearing point. The shaft 9 is supported by each of the bearing points on the valve channel 6, the first bearing point being assigned to an opening in the valve channel and the second bearing point 19 to a pocket-like recess on the valve channel 6 on the opposite side to the opening. It can also be provided, however, that the second bearing point 19 is waived so that the shaft is merely supported pivotably on a single bearing point 18 on the valve channel 6 in the area of an opening through the valve channel 6.

By contrast with the preceding illustrative embodiments, the heat exchanger according to the third illustrative embodiment (FIG. 10 to FIG. 14) has a valve channel 6' that is arranged parallel to the flow channels 1, 2. The heat exchanger comprises a housing 3 in which a total of fifteen parallel pipes 1a are arranged that together form the first flow channel 1. The walls of the pipes 1a are directly surrounded by the coolant that flows through the housing 3.

The second flow channel 2 is also incorporated into the housing 3. The flow channel 2 comprises an inner wall 3a that is shown as a dotted line in FIG. 11 and FIG. 13 and is designed as a pipe-like passage through the housing 3 that is open at both ends. Furthermore the second flow channel comprises an inner pipe 20 that is inserted into the passage. An outer surface of the inner pipe 20 has a number of spacer elements 21 formed as protruding studs on the outer surface of the inner pipe 20. When pushed into the passage, only the studs 21 touch the inner wall 3a of the housing 3 (see in particular FIG. 13), so that the thermal contact between the passage of the housing surrounded by the coolant and the inner pipe 20 through which the exhaust gas flows is very small. Overall the arrangement described forms a double wall for the second valve channel 2 with a first wall (housing passage 3a) and a second wall (inner pipe 20).

The inner pipe 20 and the passage 3a of the housing have an elongated cross-section and terminate at their end faces flush with one another.

Figure 10:
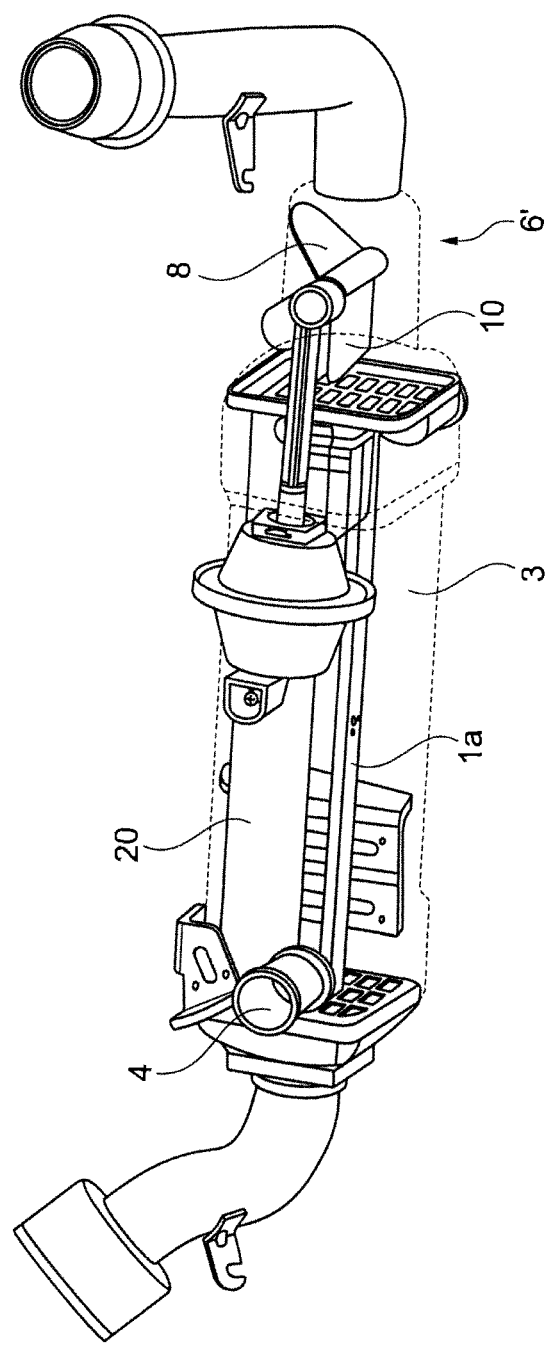
FIG. 10 shows a three-dimensional view of a third illustrative embodiment of a heat exchanger according to the invention, with inner parts of the heat exchanger being partially shown.
Figure 14:
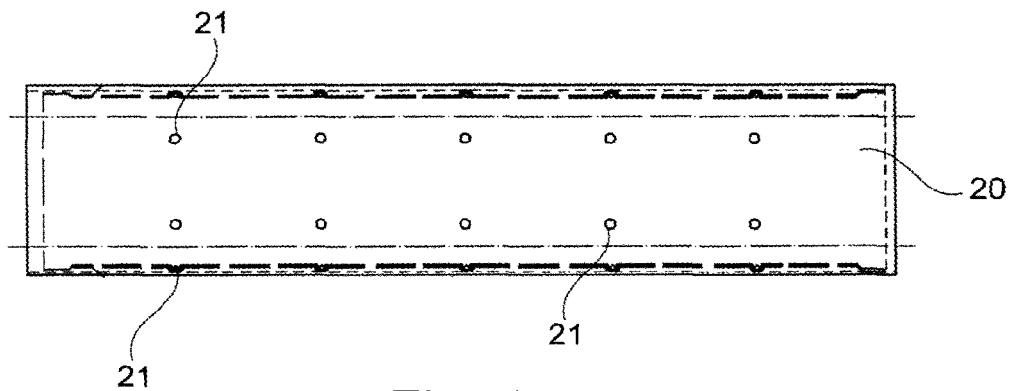
FIG. 14 shows a schematic top view onto an inner pipe of the heat exchanger from FIG. 10 to FIG. 8.
Figure 15:
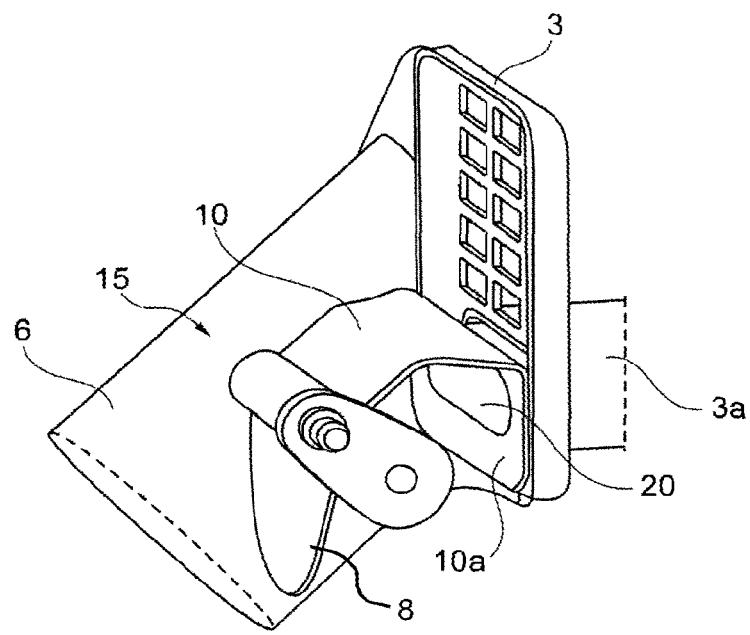
FIG. 15 shows a three-dimensional view of a detail of a heat exchanger according to the invention.

By contrast with FIG. 10, the detail view according to FIG. 15 shows a valve channel with angled orientation, but corresponds with respect to the arrangement and fixing of housing 3, inner pipe 20 and valve element 15 to the third illustrative embodiment. The illustration in FIG. 15 shows a preferred sequence of assembly and fixing of the components: The baffle plate 10 has an angled edge 10a with an opening corresponding to the cross-section of the inner pipe 20. First the baffle plate 10 is welded to one end face of the inner pipe 20 around the edge of the opening. This unit is then pushed into the passage 3a of the housing 3; due to the studs 21, a good frictional securing of the inner pipe is regularly achieved. The inner pipe and/or the baffle plate 10 is then welded to the housing, where a spot welding may also be sufficient.

The valve channel 6 is then pushed over the baffle plate 10 and, if necessary, the valve flap 8 and the shaft 9 are installed. After precise alignment of the valve channel 6 with the valve element 15, the valve channel 6 is welded to the housing with a weld seam running around the end face of the housing.

Depending on the requirements, the particular features of each of the described illustrative embodiments are not limited to these and can be freely combined with one another, so that particularly advantageous heat exchangers can be produced, if necessary, by certain combinations. In particular the recess, holding and installation of the inner pipe 20 are applicable to the first two illustrative embodiments, and the recesses 16, 17 of the valve channel for contact with the valve flap 8 are not limited to valve channels with an angled orientation.

LIST OF REFERENCE NUMBERS

1 First flow channel
1a Pipe
2 Second flow channel
3 Housing
3a
4 Line
4a Inlet-side port
4b Outlet-side port
5 Outlet channel 6, 6' Valve channel
6a First valve channel half
6b Second valve channel half
7 Inlet channel
8 Flap
8a Edge of the flap
9 Shaft
10 Baffle plate
11 Drive
12 Vacuum dashpot
13 Pivot journal
14 Push rod
15 Valve element
16 First recess
17 Second recess
18 First bearing point
19 Second bearing point
20 Inner pipe
21 Spacer elements, studs
W1 Angle between valve channel inlet and flow channel
W2 Angle between inlet channel and valve channel
S Flow direction
SK1 Flow axis of first flow channel
SK2 Flow axis of second flow channel
SV Inlet-side flow axis of valve channel
SE Inlet-side flow axis of inlet channel

What is claimed is:

1. A heat exchanger for an internal combustion engine, comprising
   a first, elongated flow channel for a passage of exhaust gas from the internal combustion engine,
   a second flow channel arranged adjacent to the first flow channel for the passage of the exhaust gas,
   a line separate from the first flow channel for the passage of a coolant, wherein heat energy may be exchanged between the exhaust gas in the first flow channel and the coolant in the line, and wherein heat energy may not be exchanged between the exhaust gas in the second flow channel and the coolant in the line, and
   a valve channel with an adjustable valve element, wherein a distribution of the exhaust gases between the first flow channel and the second flow channel may be adjusted by adjustment of the valve element, wherein the valve channel has a recess such that the valve element contacts the recess essentially planely in at least one end position, stationary
   wherein the valve element has a pivotable valve flap and a stationary angled baffle plate, each of the valve flap and the angled baffle plate having a first end and an opposing second end, the first end of each of the valve flap and the angled baffle plate respectively connected to a common shaft,
   wherein an angled surface of the angled baffle plate, provided at the second end of the angled baffle plate, contacts and remains stationary against a distal end face of the second flow channel, and
   wherein the pivotable valve flap pivots to contact the recess in the at least one end position.

2. The heat exchanger as claimed in claim 1, wherein the valve channel has a circular cross-section.

3. The heat exchanger as claimed in claim 1, wherein the recess is created by forming one wall of the valve channel by pressing or embossing.

4. The heat exchanger as claimed in claim 1, wherein the angled surface of the angled baffle plate has an opening provided therethrough, the opening being aligned with the second flow channel for the passage of the exhaust gas.

5. The heat exchanger as claimed in claim 4, wherein the angled surface of the angled baffle plate extends perpendicular to the valve flap.

6. The heat exchanger as claimed in claim 1, further comprising a second recess in the valve channel.

* * * * *

UNITED STATES PATENT AND TRADEMARK OFFICE
CERTIFICATE OF CORRECTION

PATENT NO. : 9,803,544 B2
APPLICATION NO. : 13/919480
DATED : October 31, 2017
INVENTOR(S) : Claus Beck et al.

It is certified that error appears in the above-identified patent and that said Letters Patent is hereby corrected as shown below:

On the Title Page

Item (30), Line 1, the first priority data of the Foreign Application Priority Data reads:
"May 7, 2004 (DE) ........ 10 2004 023 319 U"

It should read:
-- May 7, 2004 (DE) ........ 10 2004 023 319 --;

Item (30), page 2, Line 2, the fourth priority data of the Foreign Application Priority Data reads:
"Aug. 20, 2004 (DE) ....... 10 2004 040 668 U"

It should read:
-- Aug. 20, 2004 (DE) ....... 10 2004 040 668 --.

Signed and Sealed this
Tenth Day of April, 2018

Andrei Iancu
*Director of the United States Patent and Trademark Office*